UNITED STATES PATENT OFFICE.

ALBRECHT SCHMIDT AND CARL PRETZELL, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ORANGE VAT-DYE AND PROCESS OF MAKING SAME.

No. 872,585.　　　　Specification of Letters Patent.　　　　Patented Dec. 3, 1907.

Application filed July 24, 1907. Serial No. 385,318.

*To all whom it may concern:*

Be it known that we, ALBRECHT SCHMIDT, Ph. D., and CARL PRETZELL, Ph. D., chemists, citizens of the Empire of Germany, and residing at Höchst-on-the-Main, Germany, have invented certain new and useful Improvements in Making Orange Vat - Dyestuffs, of which the following is a specification.

We have found that, if the brown vat dyestuff resulting, for instance, by heating meta-acetylamidophenylthioglycollic-ortho-carboxylic acid

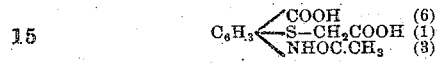

with alkalihydrate and oxidizing the isolated leuco-body thus obtained, be treated with halogen, new, very valuable orange-colored vat dyestuffs may be obtained.

Example I. 10 parts by weight of the afore-mentioned brown vat dyestuff are stirred with about 100 parts of a diluent, for instance, chlorbenzene, nitrobenzene, glacial acetic acid and the like and treated with about 20 parts by weight of bromin. On the spontaneous heating having ceased, the mass is heated for some time in a reflux condenser, filtered and washed with alkaline water and then with alcohol. The brown powder thus obtained is insoluble in alcohol, acetone, soluble with difficulty in hot nitrobenzene with an orange-brown color, soluble in concentrated sulfuric acid with a cornflower-blue color. The dyestuff contains more or less bromin according to the proportion of the latter. The dyestuff is easily reduced with alkaline hydrosulfite to a golden yellow liquid from which solution it dyes cotton and wool very fast pure orange colored tints.

Example II. Into a suspension of 10 parts by weight of the orange brown vat dyestuff in about 100 parts by weight of chlorbenzene, nitrobenzene and the like, chlorin is introduced while heating or in a reflux condenser, till no further chlorin is absorbed. The chlorinated dyestuff is isolated as in example I and is similar in every respect to the brominated dyestuff afore described. For bromin, bromin- or chlorin-yielding substances may be used.

Having now described our invention, what we claim is:—

1. The process herein described of making orange colored vat dyestuffs, which consists in treating with a halogen the brown vat dyestuff obtained by heating meta-acetyl-amidophenylthioglycollic - ortho - carboxylic acid

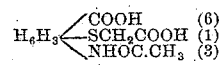

with alkalihydrate and by oxidizing the leuco bodies thus obtained.

2. As new product, the halogenated orange colored vat dyestuff, being insoluble in water, alkalies, dilute acids, alcohol, acetone, soluble with difficulty in hot nitrobenzene with an orange-brown color, soluble in concentrated sulfuric acid with a cornflower-blue color, yielding with alkaline hydrosulfite a vat from which cotton and wool are dyed in fast orange colored tints.

In testimony, that we claim the foregoing as our invention, we have signed our names in presence of two subscribing witnesses.

ALBRECHT SCHMIDT.
　　　　CARL PRETZELL.

Witnesses:
　JEAN GRUND,
　CARL GRUND.